United States Patent
Yip et al.

(10) Patent No.: US 11,457,255 B2
(45) Date of Patent: Sep. 27, 2022

(54) METHOD AND APPARATUS FOR RANDOM ACCESS OF 3D(AR) MEDIA

(71) Applicant: Samsung Electronics Co., Ltd., Suwon-si (KR)

(72) Inventors: Eric Ho Ching Yip, Suwon-si (KR); Hyunkoo Yang, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/372,993

(22) Filed: Jul. 12, 2021

(65) Prior Publication Data

US 2022/0021913 A1    Jan. 20, 2022

(30) Foreign Application Priority Data

Jul. 20, 2020   (KR) .................. 10-2020-0089629

(51) Int. Cl.
*H04N 7/173* (2011.01)
*H04N 21/235* (2011.01)
*H04N 21/81* (2011.01)
*H04N 21/44* (2011.01)
*H04N 21/234* (2011.01)

(52) U.S. Cl.
CPC ... *H04N 21/2353* (2013.01); *H04N 21/23412* (2013.01); *H04N 21/44012* (2013.01); *H04N 21/816* (2013.01)

(58) Field of Classification Search
CPC ......... H04N 21/2353; H04N 21/23412; H04N 21/44012; H04N 21/816
See application file for complete search history.

(56) References Cited

U.S. PATENT DOCUMENTS

| | | | |
|---|---|---|---|
| 10,873,737 B1* | 12/2020 | Kim | ..................... H04N 19/597 |
| 10,984,541 B2 | 4/2021 | Lim et al. | |
| 2019/0012839 A1 | 1/2019 | Wang | |
| 2019/0087978 A1* | 3/2019 | Tourapis | ................. G06T 3/005 |
| 2019/0104326 A1* | 4/2019 | Stockhammer | ......... H04L 67/02 |
| 2020/0107007 A1 | 4/2020 | Yip et al. | |
| 2020/0153885 A1* | 5/2020 | Lee | ......................... G06T 9/001 |
| 2020/0177929 A1 | 6/2020 | Wee et al. | |
| 2020/0228586 A1 | 7/2020 | Skupin et al. | |
| 2021/0195163 A1 | 6/2021 | Oh et al. | |

FOREIGN PATENT DOCUMENTS

| | | |
|---|---|---|
| KR | 10-2015-0142468 A | 12/2015 |
| KR | 10-2020-0047726 A | 5/2020 |

OTHER PUBLICATIONS

International Search Report dated Oct. 15, 2021, issued in International Application No. PCT/KR2021/008869.

* cited by examiner

*Primary Examiner* — Mulugeta Mengesha
(74) *Attorney, Agent, or Firm* — Jefferson IP Law, LLP

(57) ABSTRACT

A method of accessing 3D media content based on perspective-based random access is provided. The method includes receiving the media content and metadata, wherein the metadata includes first information about a perspective and second information about at least one face onto which the 3D object is projected, and the at least one face is associated with the perspective, and performing the perspective-based random access for the media content based on the first information and the second information.

16 Claims, 14 Drawing Sheets

TOP DOWN
VIEWS

"FRONT"
PERSPECTIVE

METHOD AND APPARATUS FOR RANDOM ACCESS OF 3D(AR) MEDIA

CROSS-REFERENCE TO RELATED APPLICATION(S)

This application is based on and claims priority under 35 U.S.C. § 119(a) of a Korean patent application number 10-2020-0089629, filed on Jul. 20, 2020, in the Korean Intellectual Property Office, the disclosure of which is incorporated by reference herein in its entirety.

BACKGROUND

1. Field

The disclosure relates to multimedia content creation, processing, delivery, decoding, and rendering of mixed reality and augmented reality content, including three-dimensional (3D) media represented by point clouds and meshes. More particularly, the disclosure relates to a method and an apparatus for random access based on 3D media perspective.

2. Description of Related Art

Traditional two-dimensional (2D) video is encoded using techniques, such as intra-frame coding and inter-frame coding. The inter-frame coding achieves coding efficiency (video compression) by generating frames that refer to data from other frames (a previously received frame or a future frame). Such inter-frame coding generates a group of pictures (GoP) concept, in which GoP defines the structure of frame types including (at least) one intra-frame. Intra-coded pictures (I-frames) contain all data necessary for decoding within the corresponding frame and are independently decodable. Predictive pictures (P-frames) contain only image changes from the previous frame. Bidirectional predictive pictures (B-frames) achieve even more compression by using differences between the current frame and the previous and next frames and specifying content of the differences.

A GoP output, defined as a video compression result, means that not all frames are independently decodable. Accordingly, if a user browses a 2D video in trick mode (e.g., scrolling from 10 seconds of movie presentation time to 45 seconds of movie presentation time), random access points are defined such that the closest independently decodable frame (I-frame) is found, parsed, and used for playback (rendered directly or used for decoding and rendering dependent frames).

The above information is presented as background information only to assist with an understanding of the disclosure. No determination has been made, and no assertion is made, as to whether any of the above might be applicable as prior art with regard to the disclosure.

SUMMARY 3D media (point cloud and mesh) differ from traditional 2D video media in that a user is free to view 3D media from multiple (unlimited) different viewing directions (perspectives). However, processing (i.e., decoding and rendering) of 3D media is computationally intensive and requires high processing power (e.g., a moving picture experts group video-based point cloud compression (MPEG V-PCC) decoding). This complexity is amplified when the 3D media contains many points. The existing technologies require transmission, decoding, 3D media reconstruction and rendering of the entire 3D media, regardless of the user's perspective or location, in order to use 3D media.

Aspects of the disclosure are to address at least the above-mentioned problems and/or disadvantages and to provide at least the advantages described below. Accordingly, an aspect of the disclosure is to provide a method and an apparatus for random access based on 3D media perspective.

Additional aspects will be set forth in part in the description which follows and, in part, will be apparent from the description, or may be learned by practice of the presented embodiments.

In accordance with an aspect of the disclosure, a method for providing media content including a three-dimensional (3D) object for perspective-based random access by an apparatus of a content provider is provided. The method includes generating metadata for the media content, wherein the metadata includes first information on a perspective and second information on at least one face onto which the 3D object is projected, and the at least one face is associated with the perspective, and transmitting the media content and the metadata.

In accordance with another aspect of the disclosure, a method for accessing media content including a three-dimensional (3D) object based on a perspective-based random access by an apparatus of a user is provided. The method includes receiving the media content and metadata, wherein the metadata includes first information on a perspective and second information on at least one face onto which the 3D object is projected, and the at least one face is associated with the perspective, and performing decoding and rendering for the media content based on the first information and the second information.

In accordance with another aspect of the disclosure, an apparatus of a content provider for providing media content including a three-dimensional (3D) object for perspective-based random access is provided. The apparatus includes a transceiver, and at least one processor configured to generate metadata on the media content, the metadata including first information on a perspective and second information on at least one face onto which the 3D object is projected, and the at least one face being associated with the perspective, and control the transceiver to transmit the media content and the metadata.

In accordance with another aspect of the disclosure, an apparatus of a user for accessing media content including a three-dimensional (3D) object based on perspective-based random access is provided. The apparatus includes a transceiver, and at least one processor configured to control the transceiver to receive the media content and metadata, wherein the metadata includes first information on a perspective and second information on at least one face onto which the 3D object is projected, and the at least one face is associated with the perspective, and the at least one face being associated with the perspective, and perform decoding and rendering for the media content based on the first information and the second information.

Defining random access perspectives enables the following characteristics:

1. User perspective "jumping" according to defined random access perspectives (not head movement)
2. High-speed decoding and rendering based on random access perspectives
3. Guiding perspective for viewer when browsing 3D augmented reality (AR) media in trick mode In addition, according to random access perspectives, there is no need to transmit, decode, and/or render the entire 3D media for specific service application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
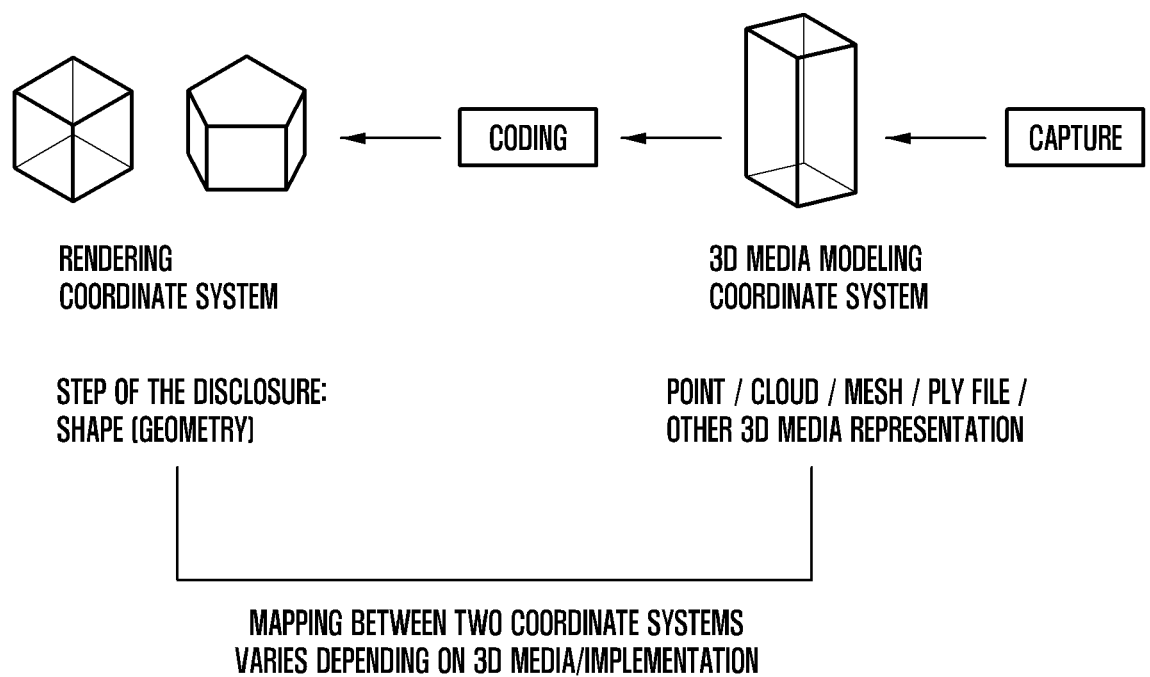
FIG. 1 illustrates coordinate systems used in an end-to-end system to represent 3D media during each of different operations according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Skilled artisans will appreciate that elements in these figures are illustrated for simplicity and clarity and have not necessarily been drawn to scale. For example, the dimensions and/or relative positions of some elements in the drawings may be exaggerated relative to other elements to help improve understanding of various embodiments. In addition, common but well-understood elements useful or necessary in commercially viable embodiments are often not shown in order to facilitate less obscured viewing of these various embodiments. Although particular acts and/or operations may be described or depicted in a particular order of occurrence, those skilled in the art will also understand that such specificity for the sequence is not in practice required.

Characteristics of 3D media in augmented reality (AR) are that a viewer is rarely able to view 3D media from several different perspectives at the same time (e.g., the viewer cannot see the front and back of a doll, which is presented in 3D media, placed on a chair, and in reality it is physically impossible to do so). Therefore, by using these characteristics (e.g., using slice and tile based image segmentation technology in 2D video codec), the disclosure defines a perspective-based random access concept for 3D media.

By defining random access perspectives for 3D media content in content creation operation (by a content provider or service provider), processing requirements for decoding and rendering of 3D media can be reduced. This is achieved by decoding and rendering only defined random access points as selected by the user or predefined as metadata in the media data, thus the number of points/mesh surfaces required for decoding and rendering may be reduced.

Comparison of traditional 2D video temporal random access and 3D media perspective random access:

2D Video:

Use inter-frame correlation->video coding efficiency->time random access required 3D Ar Media:

Use correlation between 3D media and perspective->3D media coding, decoding, rendering efficiency->Perspective random access required Defining random access perspectives enables the following characters:

1. User perspective "jumping" according to defined random access perspectives (not head movement)

2. High-speed decoding and rendering based on random access perspectives

3. Guiding perspective for viewer (in particular, when browsing 3D (AR) media in trick mode)

For an AR service using an AR glasses-type device, user movement in AR is mainly limited to head movement or limited body movement; accordingly, when the random access perspective includes 3D media data that can cover such a small movement, additional fetching/decoding/rendering is not required.

The main contents of the disclosure for defining and supporting random access perspectives are as follows:

1. Content creation (content provider and/or service provider) operations for assigning, defining, and creating random access perspectives for 3D media (specific to content)

2. Playback (client) device operations for perspective-based random access perspective switching and trick mode playback of media created and produced in 1

3. Syntax and semantics of metadata that enable random access perspectives for 3D media created in 1 and delivered to the client by the 3D media itself (together or separately) and consumed by playback (client) device as specified in 2

According to various embodiments of the disclosure, operations for content creation may be performed by a content provider and/or a service provider apparatus that provides or delivers 3D content, and operations for perspective-based random access (also referred to as perspective random access) may be performed by an apparatus of a user (also a client or a player) playing 3D content.

Recently, third generation (3G) wireless communication has evolved into a long term evolution (LTE) cellular communication standard, which is also referred to as 4G wireless communication. Both 3G and fourth generation (4G) technologies are compliant with the third generation partnership project (3GPP™) standard. 4G networks and phones are designed to support mobile Internet and higher speeds for activities, such as video streaming and gaming. The 3GPP™ standards are now developing a fifth generation (5G) of mobile wireless communications, which is set to initiate an operation change in the delivery of better communications, for example powering businesses, improving communications within homes and spearheading advances, such as driverless cars.

According to various embodiments of the disclosure, 3D content (3D media) including such metadata may be transmitted to a user's apparatus based on, for example, mobile wireless communication of 3GPP™, particularly 5G.

FIG. 1 illustrates coordinate systems used in an end-to-end system to represent 3D media during each of different operations according to an embodiment of the disclosure. After capture operation, raw data is processed during 3D modeling operation.

Referring to FIG. 1, a coordinate system used in this operation depends on a media representation format, such as a PLY format. An example of the coordinate system used in a PLY file is a 1024×1024×1024 cube expressed by 10 bits for each of x, y, and z axis directions. This PLY file is then coded (compressed) using techniques, such as MPEG V-PCC, then delivered and decoded to output the original media in the same modeling coordinate system. During content creation operation, a 3D media modeling coordinate system is mapped to a rendering coordinate system used for both 1) a rendering process and 2) a coding process to enable more efficient decoding and rendering (e.g., perspective-based random access).

The disclosure describes different logical shapes (geometry) for a rendering coordinate system that enables perspective-based random access. Mapping between the 3D modeling coordinate system and the rendering coordinate system depends on its implementation and 3D media format, and one example of the mapping is mapping a default point in a modeling coordinate system to another default point in a 3D rendering coordinate system. The perspectives described in the disclosure are defined in relation to the rendering coordinate system, and are determined through the content creation operation (by the content creator or service provider).

Figure 2:
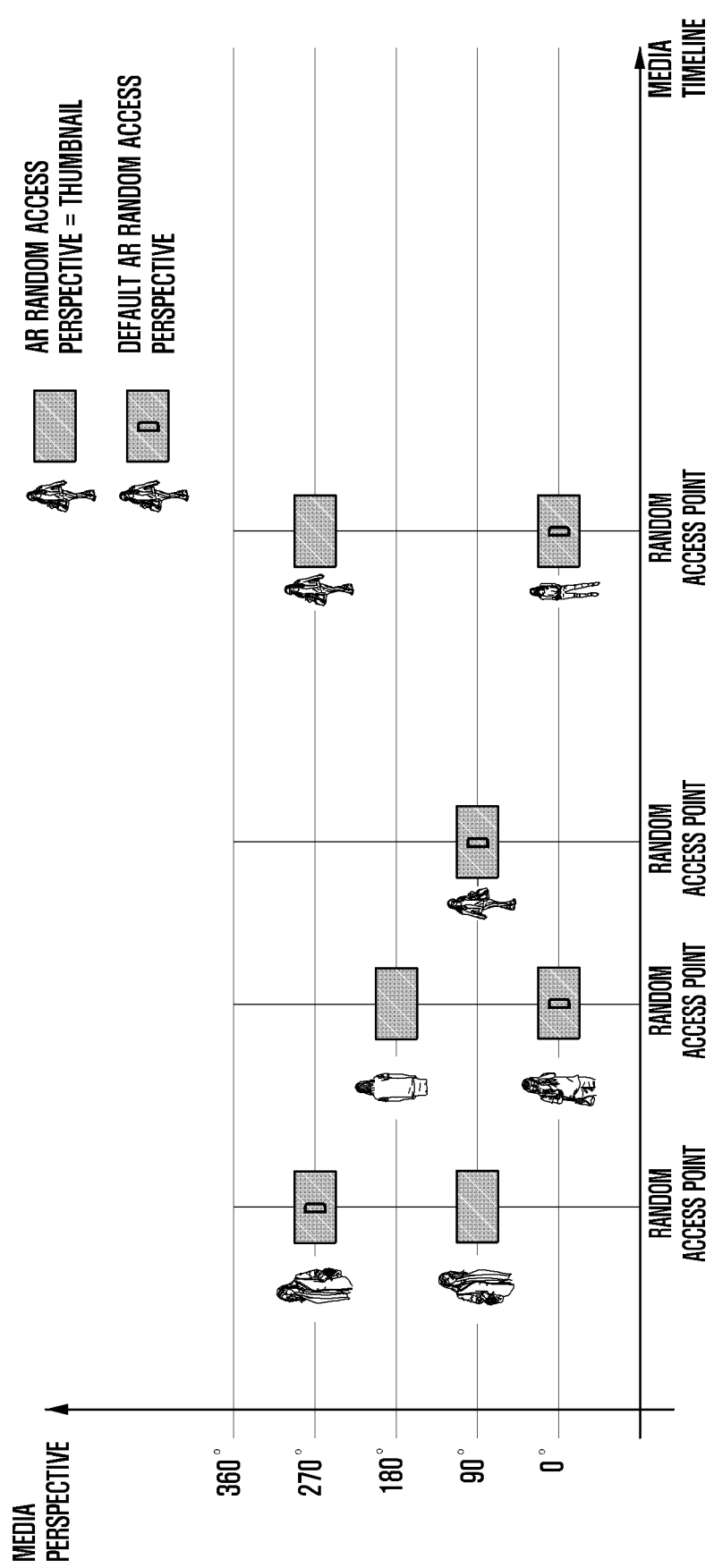
FIG. 2 illustrates a perspective of an additional dimension for 3D media according to an embodiment of the disclosure.

FIG. 2 illustrates "perspective" of an additional dimension for 3D media according to an embodiment of the disclosure.

Referring to FIG. 2, for each time (line) random access point, one or more random access perspectives may be defined. For any given time (line) random access point, data defined for the random access perspectives can be more easily identified (discovered), parsed, decoded, and rendered. If there is more than one random access perspective defined at a given time (line) random access point, for example, a default random access perspective may be defined such that the default perspective is selected without user interaction. Player operations for random access perspective-based use cases are described in FIGS. 8 and 9 below.

Figure 3A:
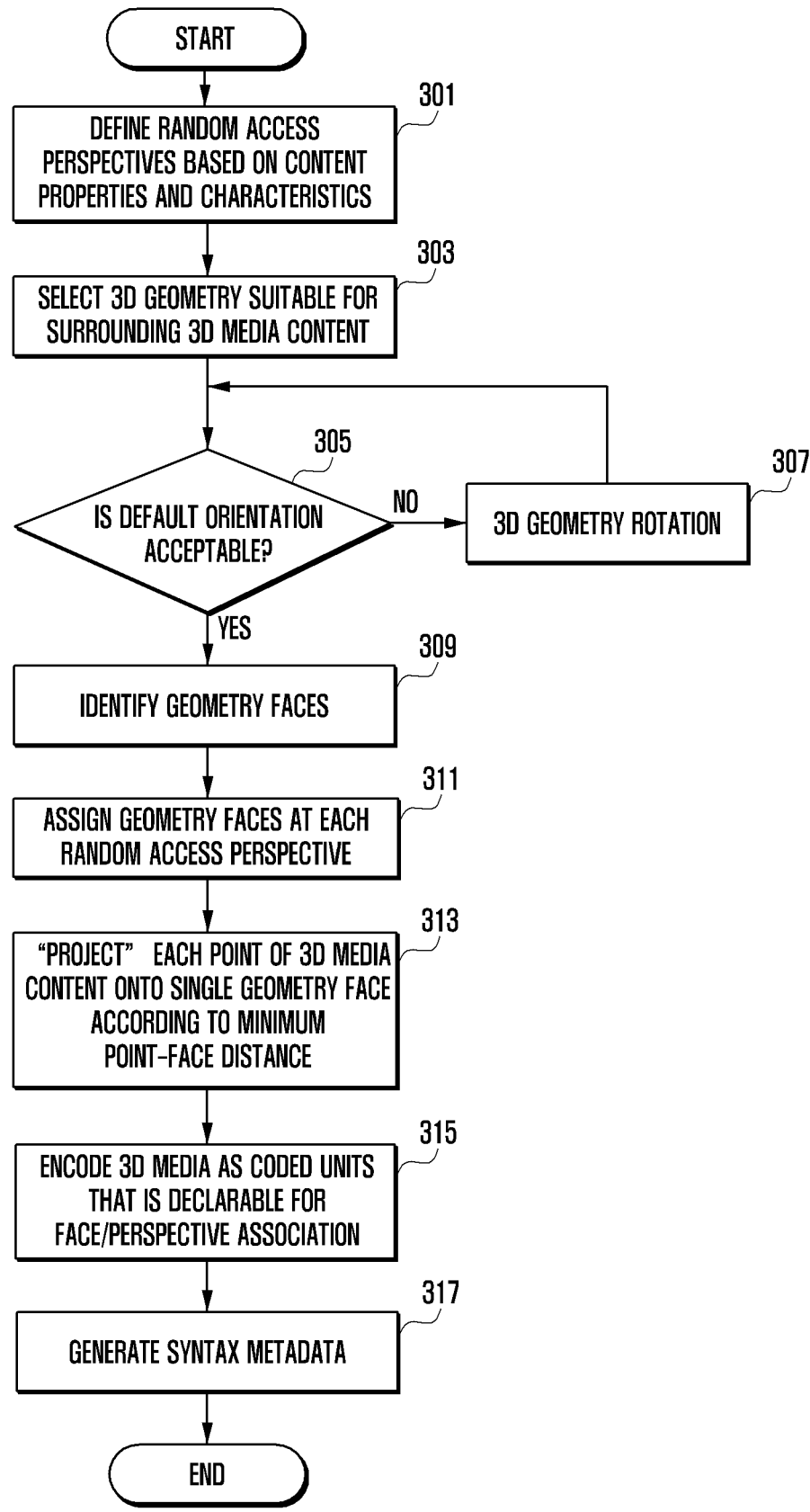
FIG. 3A is a flowchart illustrating operations of a content creation procedure (by a content provider and/or a service provider) according to an embodiment of the disclosure.
Figure 3B:
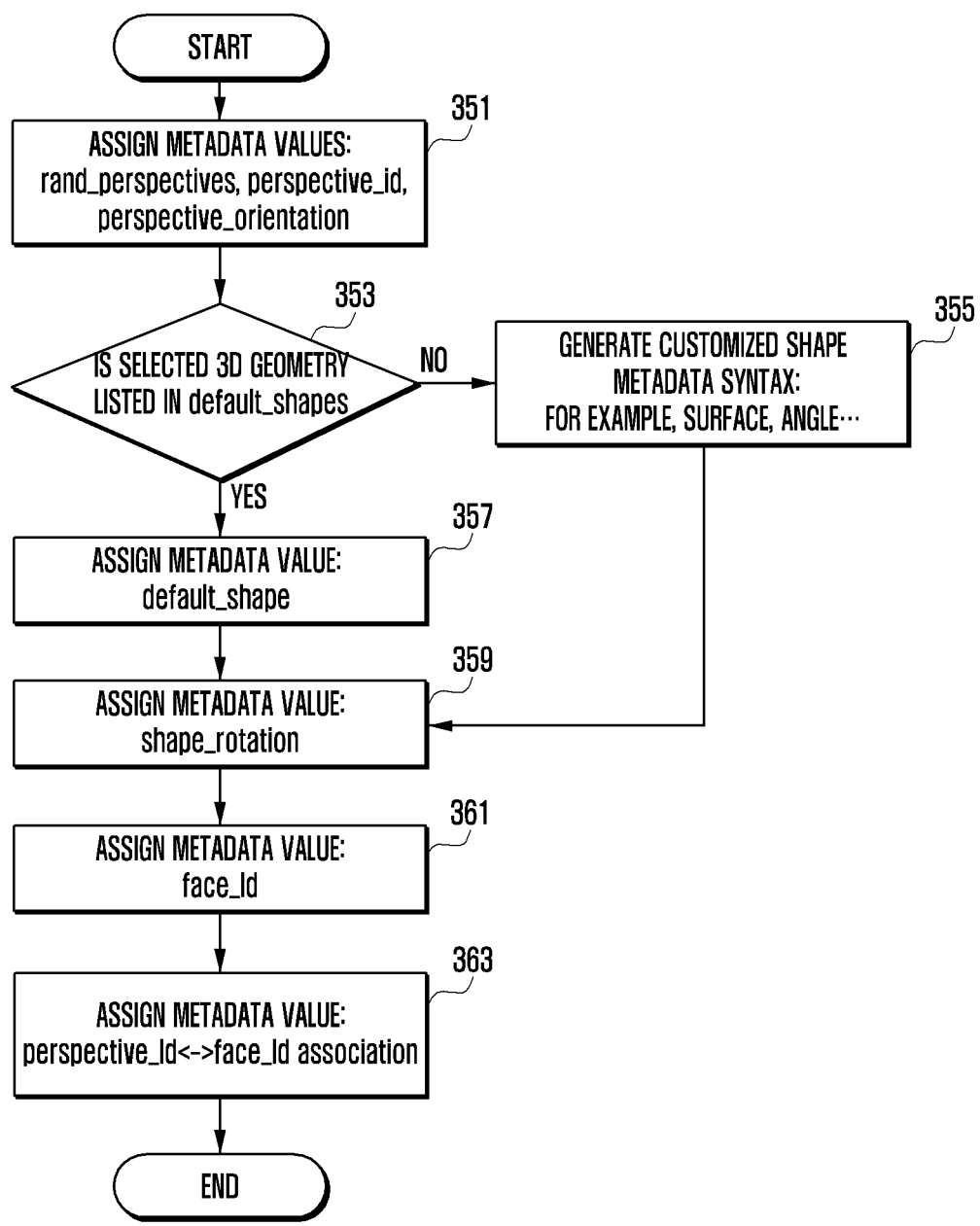
FIG. 3B is a flowchart illustrating operations of a content creation procedure (by a content provider and/or a service provider) according to an embodiment of the disclosure.

FIGS. 3A and 3B are flowcharts illustrating operations of content creation procedure (by a content provider and/or service provider's apparatus) for assigning, defining, and creating random access perspectives to 3D media content (also called 3D media or 3D content) according to various embodiments of the disclosure. FIG. 3A illustrates a logical flow of processes, and FIG. 3B is an example of metadata defined in Table 1 below (logical values for syntax are shown in Table 2 below), and illustrates an example of actually generating random access perspective metadata for 3D media content by allocating specific entry values.

Referring to FIG. 3A, the random access perspective are defined in operation 301 by a content creator/service provider based on content attributes and characteristics. Referring to FIG. 3B, according to the defined random access perspectives, values are assigned for relevant metadata in operation 351 as follows:

rand_perspectives: total number of random access perspectives for content at given timestamp perspective_id: identifier for each random access perspective perspective_orientation: defined as 3D orientation of designated perspective, orientation quaternion, or two rotation angles in Cartesian coordinates After desired random access perspectives are designated, a suitable 3D geometry is selected to surround 3D media content in operation 303. The selected geometry may be one of predefined lists listed as part of semantics defined by default_shapes in operation 353, and in this case, the corresponding value is assigned to default_shape syntax in operation 357. When the selected geometry is not present in the list defined by default_shapes, a shape customized using a set of flexible syntax defining such shapes (by indicating surfaces, edges, corner angles, etc.) may be represented in operation 355.

After selecting the geometry, for the default "front" of the 3D media modeling coordinate system (see FIG. 1), whether the default orientation of the geometry is acceptable from a missing viewpoint for each random access perspective (together with projection of points of each perspective for potential faces of the geometry) may be estimated in operation 305. When the default orientation is determined to be unacceptable, an appropriate 3D rotation is applied to the geometry in operation 307. This application of rotation is expressed in operation 359 by assigning the relevant values to shape_rotation syntax, or expressed by orientation quaternion or two rotation angles in Cartesian coordinate. When rotation is not used, the values of shape_rotation will be zero.

After the geometry and its orientation are defined, the faces of the geometry are identified in operation 309, and an identifier represented by syntax face_id is assigned to each face in operation 361.

After the random access perspectives and faces are defined, one or more geometric faces defined to correspond to the perspective are assigned to each random access perspective in operation 311. Two or more perspectives may be assigned to one face. In case of each perspective, the number of faces associated with each perspective is reflected by the value of syntax perspective faces in operation 363, and the association between the perspective and its faces is represented in operation 363 by face_id of the associated faces (e.g., the last for( ) loop in Table 1).

Figure 4:
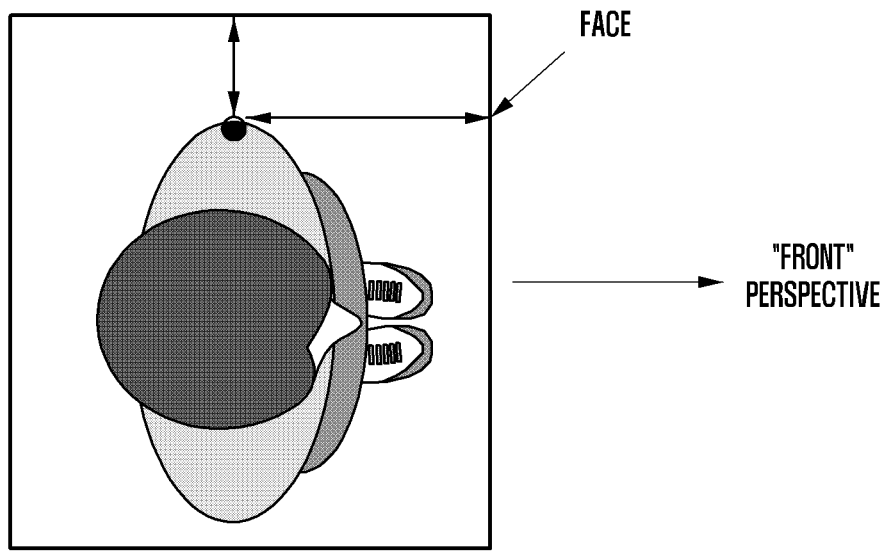
FIG. 4 illustrates a point-to-face assignment/projection operation based on a minimum point-face distance according to an embodiment of the disclosure.

Each point of the 3D media content is assigned to at least one geometric face according to a minimum point-face distance as described in FIG. 4, for example, it may be assigned to a single geometric face in operation 313.

After all points of the 3D media content are assigned to the faces, the 3D media content data is encoded into coded units which are declarable, decodable and renderable according to the independent faces for this association, in operation 315.

Syntax metadata associated with the flows described above are generated in operation 317 as defined in operations of FIG. 3B.

Appropriate selection and rotation of the 3D geometry is a matter of optimization between decoding/rendering data quantity/complexity and the missing points (if rendered) for the desired perspectives defined for the 3D media content.

FIG. 4 illustrates a point-to-face assignment/projection operation according to a minimum point-to-face distance according to an embodiment of the disclosure.

Referring to FIG. 4, a 3D media (person) represented by a point cloud is surrounded using a cube geometry (shown here as a top down view). For example, each point in the point cloud may be projected onto a face of a geometry where the point-to-face distance is minimized. In case of the point as shown, the point is assigned (projected) to the top face because a distance to the top face (shown in 2D as an example only) is shorter than a distance to the other face. A "front" perspective is shown to semantically understand the definition of a perspective (defined by its orientation with respect to the geometry's coordinate system and its ID).

Figure 5:
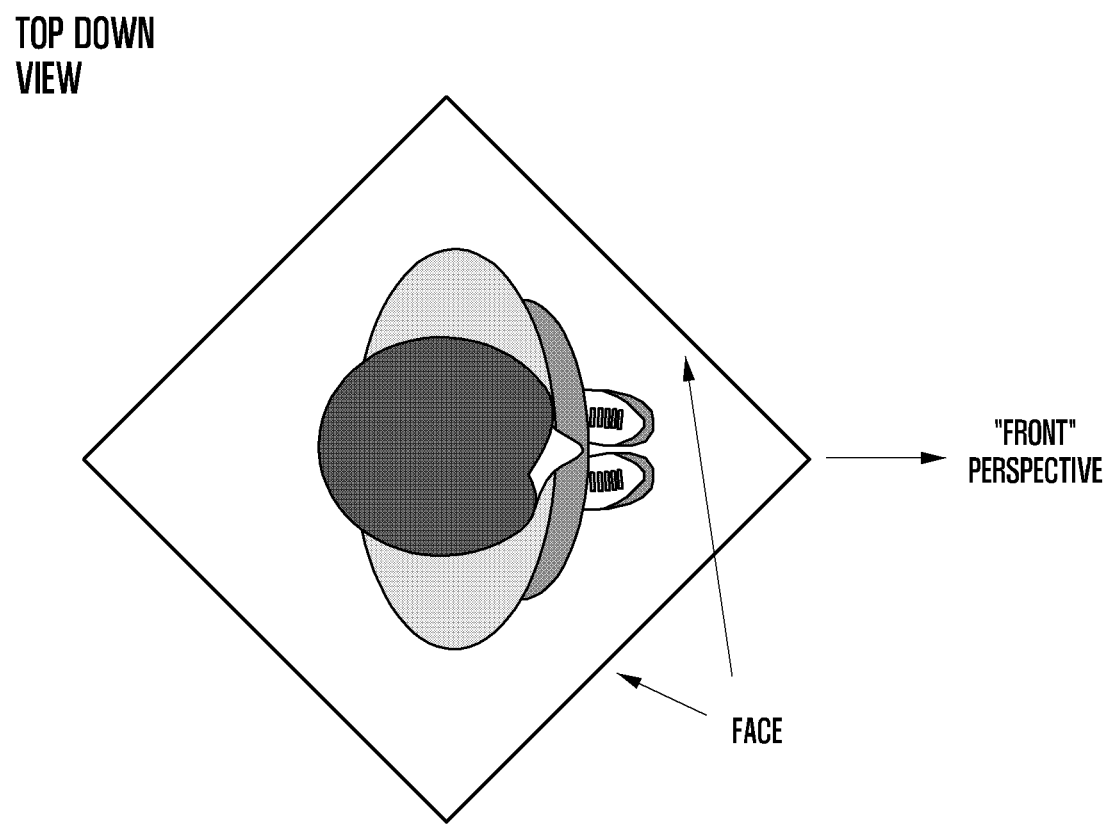
FIG. 5 illustrates a cube geometry being rotated by 45 degrees in a single plane only, for a face assignment/projection operation according to an embodiment of the disclosure.
Figure 6:
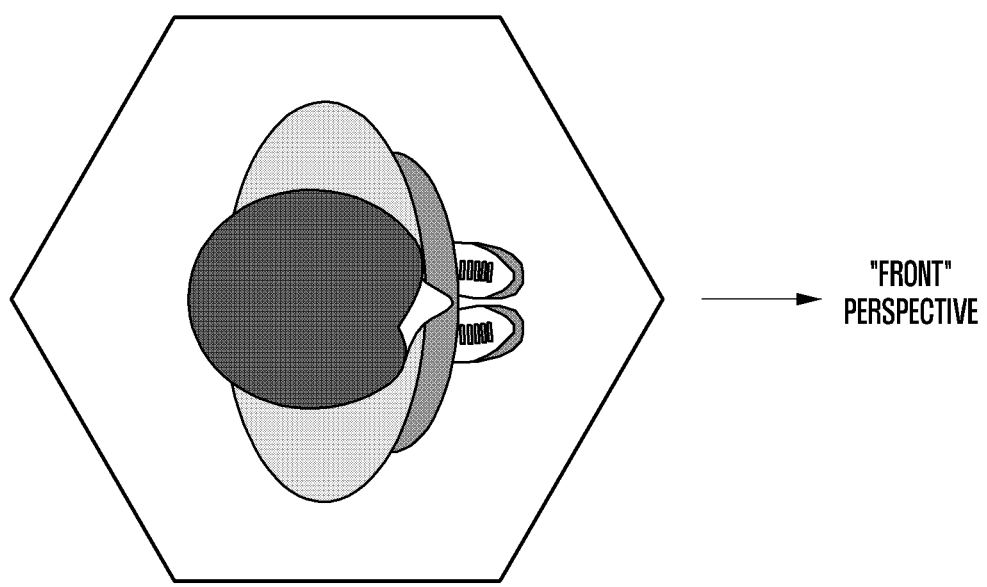
FIG. 6 illustrates a hexagonal geometry for a face assignment/projection operation according to an embodiment of the disclosure.

The "front" perspective for the shown cube geometry may have one face for association. The cube geometry has the following properties for the illustrated example 3D content (person):

Cube: front—single face-patch projection/assignment:
Points closest to the lateral faces are not included in front face
Front perspective decoding and rendering only uses patches that are projected on faces associated with front perspective (only one face for cube in this case), which will have a number of missing points, e.g., a human shoulder, represented by 3D media FIG. 5 illustrates a cube geometry that has been rotated by 45 degrees in a single plane only and is shaped like a diamond when viewed from above according to an embodiment of the disclosure. This example has the following properties for the illustrated example 3D content (person):

Diamond: front—2 face-patch projection/assignment:
Two faces represent front perspective
Decoding/rendering complexity of front perspective is reduced in half FIG. 6 illustrates a hexagonal geometry, which shows only lateral faces (if not rotated) according to an embodiment of the disclosure. Overhead faces of 3D media (not shown) can be assigned accordingly (e.g., as a group of non-flat faces creating a pattern like a single hexagonal flat face ceiling or roof). This example has the following properties:

Hexagon: front—2 face-patch projection/assignment:
Two faces represent front perspective
There may be no points projected onto the lateral faces, but better than single face of cube
Suitable for distant objects or narrow objects (viewed from the front)

Figure 7:
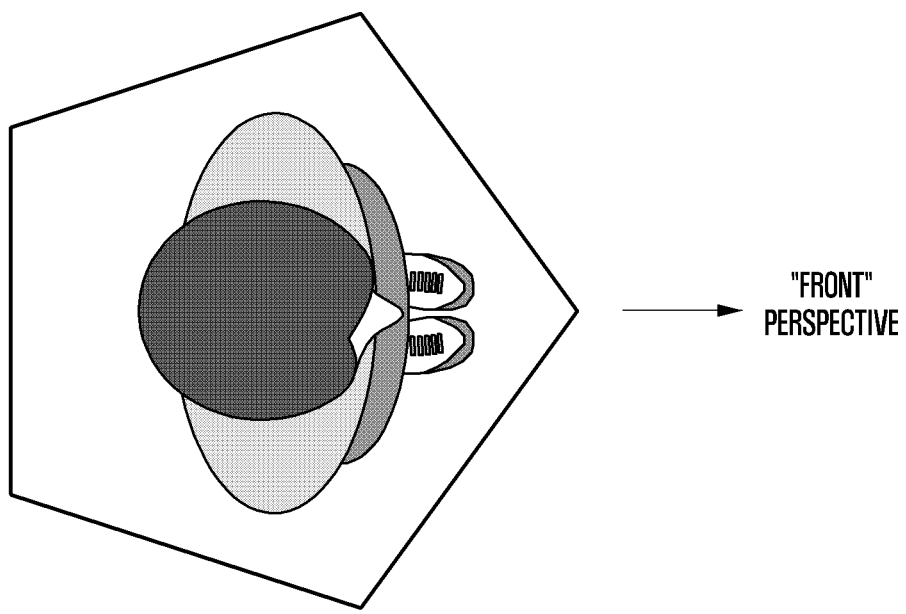
FIG. 7 illustrates a pentagonal geometry for a face assignment/projection operation according to an embodiment of the disclosure.

FIG. 7 illustrates a pentagonal geometry, showing only the lateral faces (if not rotated) according to an embodiment of the disclosure. Overhead faces of 3D media (not shown) can be assigned accordingly (e.g., as a group of non-flat faces creating a pattern like a single hexagonal flat face ceiling or roof). This example has the following properties:

Pentagram: front—2 face-patch projection/assignment with respect to the illustrated example 3D content (person):
Two faces represent front perspective
Can be better than hexagon in terms of missing points for front perspective, but not better than diamond FIG. 8 a flowchart illustrating player operations (by a user, client, or player's apparatus) for perspective random access (e.g., perspective-based random access perspective switching) in a single temporal random access point according to an embodiment of the disclosure.

Figure 8:
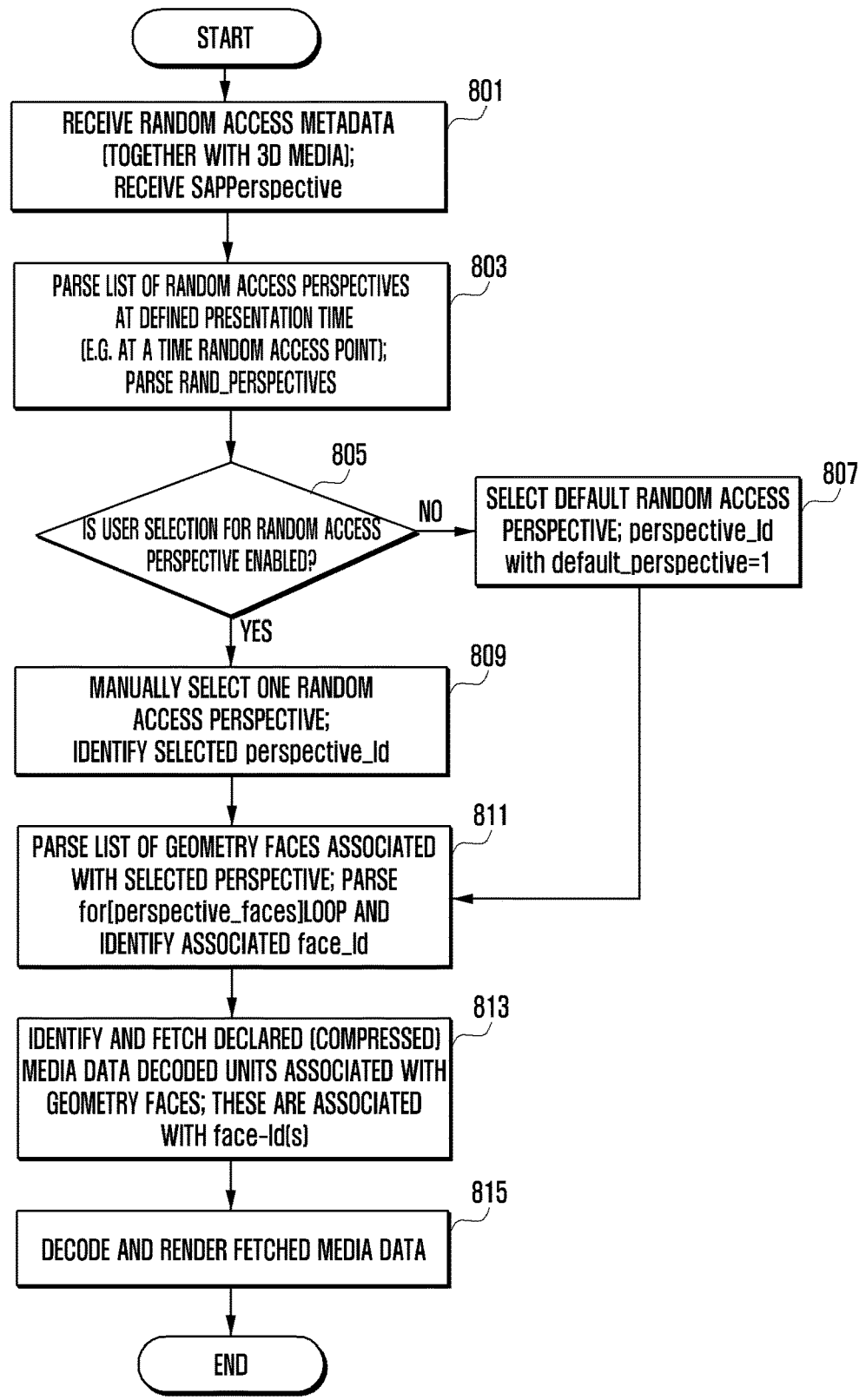
FIG. 8 is a flowchart illustrating player operations for perspective random access in a single time random access point according to an embodiment of the disclosure.

Referring to FIG. 8, for perspective-based random access, a client (player) (e.g., an apparatus) receives 3D media content along with metadata that enables the perspective-based random access, in operation 801. In various syntax given by Table 1, a syntax structure SAPPerspective that enables the perspective-based random access is received by the client along with the 3D media content.

For a given single time point, the player parses the list of the random access perspective defined at a given presentation time in operation 803. The number of the random access perspectives is provided by rand_perspectives.

After this list is identified, depending on whether user selection of the random access perspective is enabled in operation 805, the player identifies an identifier perspective_id for the perspective selected by the user in operation 809. Alternatively, a default random access perspective perspective_id with default_perspective=1 is selected in operation 807.

For the selected perspective identified by perspective_id, the list of the faces of the geometry associated with the selected perspective is parsed; according to the syntax structure given in Table 1, a for(perspective_faces) loop is parsed (where perspective_faces defines the number of the faces of the geometry associated with the given perspective), and identifiers face_id for the associated faces are identified in operation 811.

After face ids of the associated faces are identified, the player fetches media data-coded units associated with the faces of the geometry in operation 813. The association of the media data-coded units can be declared either as the faces of the geometry or directly with defined random access perspectives, depending on the implementation.

The fetched media data is decoded and rendered in operation 815.

A method of using the metadata for these operations is defined in Table 1 below.

Figure 9:
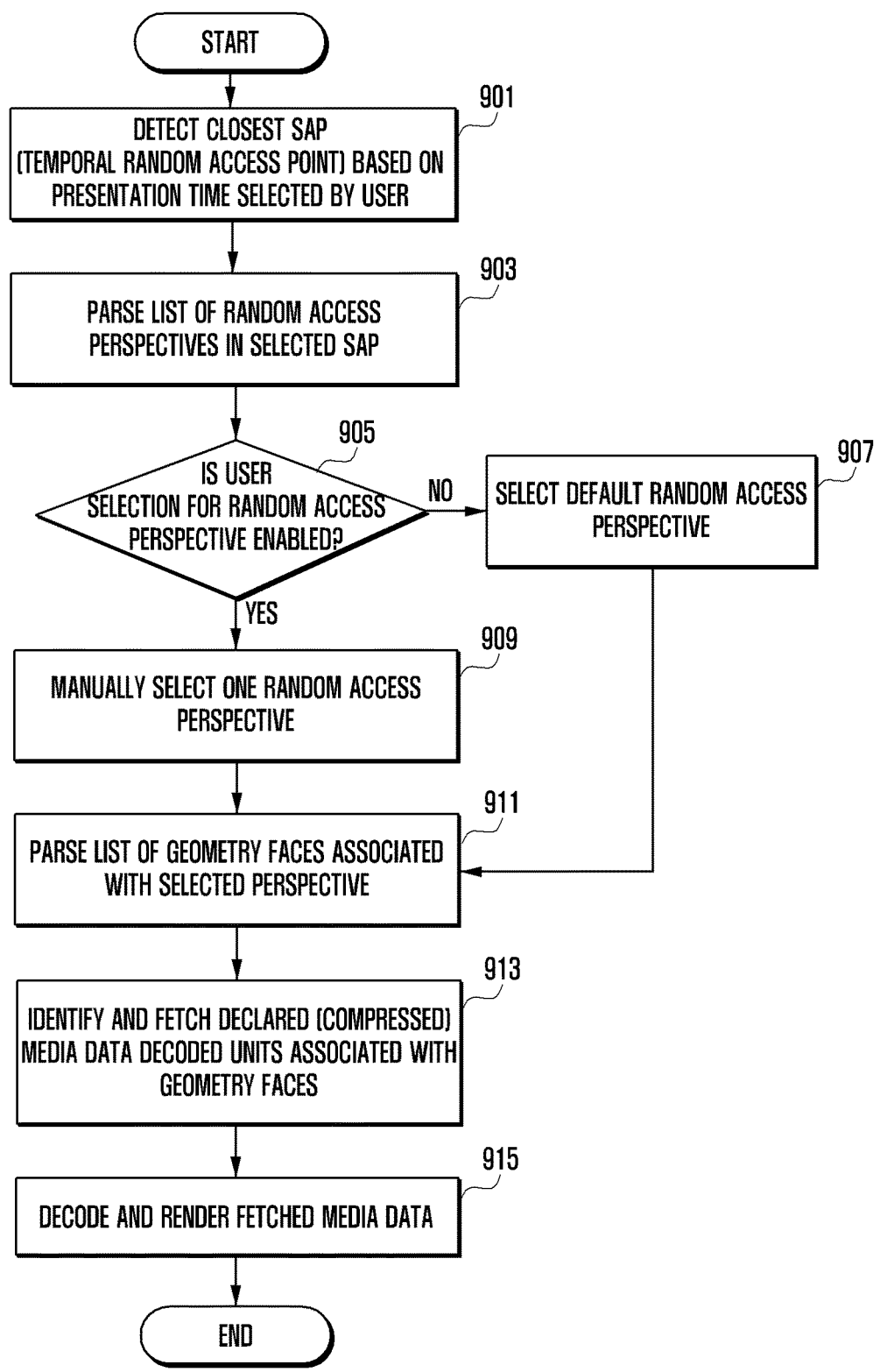
FIG. 9 is a flowchart illustrating player operations for trick mode playback of AR 3D media according to an embodiment of the disclosure.

FIG. 9 is a flowchart illustrating player operations (by a user, client, or player's apparatus) for trick mode playback of AR 3D media according to an embodiment of the disclosure. Before performing the operations as in FIG. 8, the closest temporal random access perspective (SAP) is first detected.

Referring to FIG. 9, as a user selects a specific presentation time through trick mode playback, the closest stream access point (SAP) and temporal random access point is detected in operation 901. Operations 903, 905, 907, 909, 911, 913, and 915 are the same as operations 803, 805, 807, 809, 811, 813, and 815, respectively.

Depending on the implementation, a player (e.g., an apparatus) may choose to decode and render media identified as the closest SAP and random access perspective depending on the presentation time selected by the user. Alternatively, by choosing to decode the media only without rendering, the player may allow to decode media accurately at a presentation time (depending on the closest SAP and random access perspective) selected by the user by using the decoded data.

TABLE 1

```
syntax
class SAPPerspective
    unsigned int( )        shape;
    unsigned int( )        shape_rotation;
    unsigned int( )        num_faces;
    unsigned int( )        rand_perspectives;
    for(i=0; i<rand_perspectives; i++){
        unsigned int( )    perspective_id;
        unsigned int( )    perspective_orientation;
        unsigned int( )    perspective_faces;
        unsigned int( )    default_perspective;
        for(i=0; i< perspective_faces; i++){
            unsigned int( )    face_id;
        }
    }
semantics
shape specifies the shape of the geometry used to surround the 3D media
(point cloud) for perspective-based random access. This semantics of
this syntax can be either 1) a predefined list of shapes, or 2) a set of sub-
syntax which defines an exact specific arbitrary shape.
shape_rotation specifies the 3D rotation of geometry's defined coordinate
system (with unique origin and default orientation), as described in
Table 2, relative to the 3D media point cloud inside the geometry. The
3D rotation can be specified either as a 3D rotation quaternion, or as two
angles in a Cartesian coordinate system. When this value is 0, the origin
and default orientation of the 3D media point cloud (as defined by its
PLY coordinates) are matched to that of the geometry's coordinate
system origin and default orientation.
num_faces specifies the number of faces on the geometry shape. It can
be optional when regular polygons are used as the geometry surrounding
the 3D media.
rand_perspectives specifies the number of random access perspectives
defined for the 3D media.
perspective_id specifies a unique identifier for the random access
perspective.
perspective_orientation specifies the orientation of the random access
perspective as either a 3D orientation quaternion, or as two angles in
a Cartesian coordinate system, relative to the geometry's defined
coordinate system (with unique origin and default orientation).
perspective_faces specifies the number of geometry faces associated
with the random access perspective.
default_perspective specifies, when equal to 1, that the random access
perspective is a default random access perspective. When
default_perspective is equal to 0, the random access perspective is not
a default random access perspective.
face_id specifies a unique identifier for the geometry face as predefined
according to the geometry shape given by shape.
```

Table 1 shows syntax and semantics for random access perspectives, which are:

1. created by content provider and/or service provider through content creation procedure shown in FIGS. 3A and 3B, 2. delivered as metadata between media server (content provider's apparatus) and media client (media player or user's apparatus), together with or separately from 3D media that random accesses perspective represents, and 3. received and parsed by media client to enable perspective-based random access (for all use cases/operations described herein).

Figure 10:
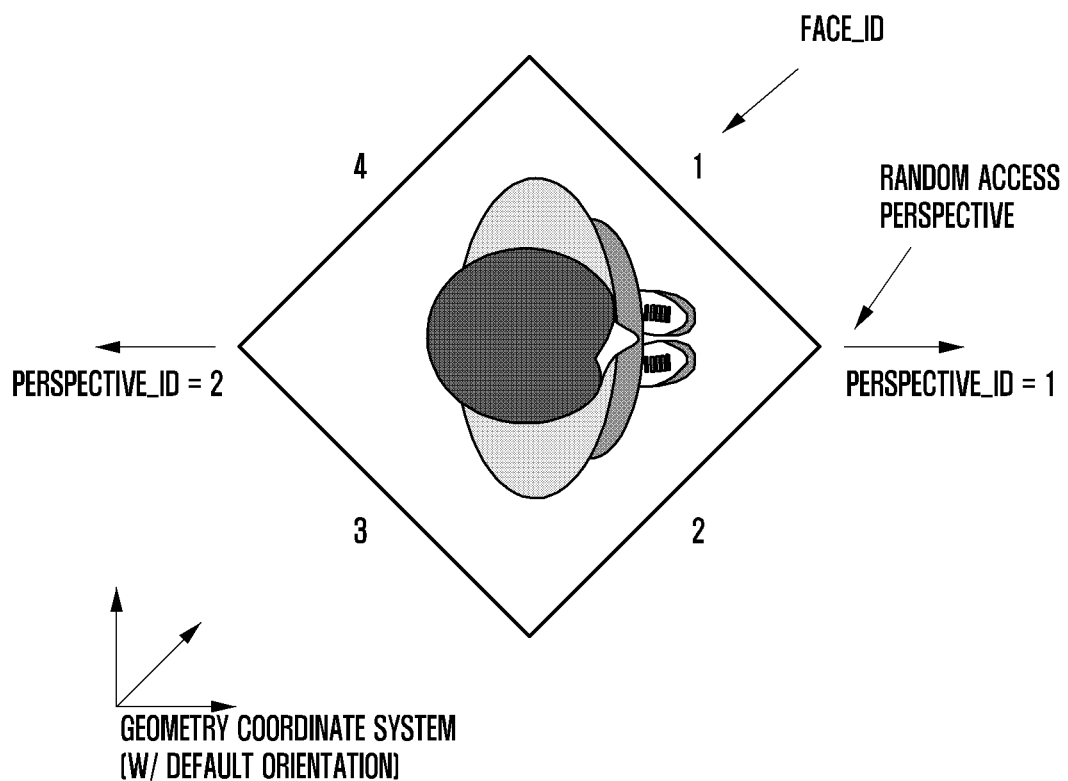
FIG. 10 illustrates representations of face_id, perspective_id syntax, and semantics according to a use case geometry of FIG. 5 according to an embodiment of the disclosure.

FIG. 10 illustrates the expression of face_id, perspective_id syntax, and semantics according to the use case geometry of FIG. 5 according to an embodiment of the disclosure.

Referring to FIG. 10, each geometry has a defined coordinate system with a unique origin and default orientation that is used as the standard for shape rotation (in 3D), perspective orientation (in 3D), and other processing that requires accurate representation within the geometry (or outside, with respect to media within the geometry).

TABLE 2

```
syntax
class SAPPerspective
    unsigned int( ) shape(diamond);
    unsigned int( ) shape_rotation(0°);
    unsigned int( ) num_faces(4);
    unsigned int( ) rand_perspectives(2);
    for(i=0; i<rand_perspectives; i++){
        unsigned int( ) perspective_id[1,2];
        unsigned int( ) perspective_orientation[0°,180°];
        unsigned int( ) perspective_faces[2,2];
        unsigned int( ) default_perspective[1,0];
        for(i=0; i< perspective_faces; i++){
            unsigned int( ) face_id([1,2],[3,4]);
        }
    }
```

Table 2 shows an example of logical values of the syntax defined in Table 1 for the use case geometry shown in FIG. 10. Referring to FIG. 10, although the number of faces here is indicated as "4", because of a 3D geometry, the actual value must include the ceiling face and the floor face (i.e., more than 6 faces). The logical values for shape rotation and perspective orientations are provided in 2D rotation as an example only, and actual values are provided in 3D.

Figure 11:
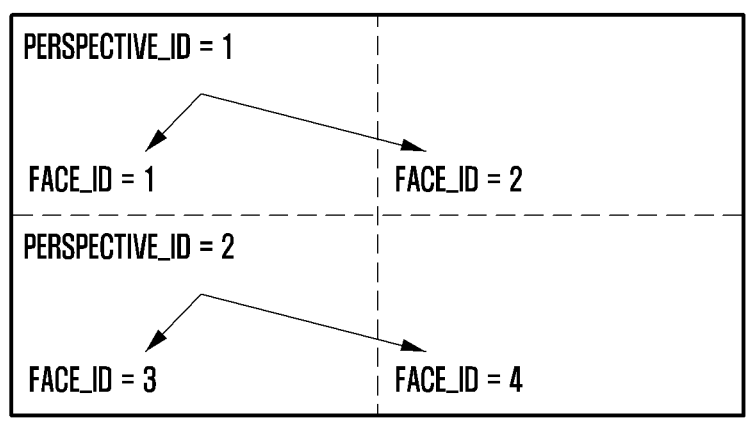
FIG. 11 illustrates an association between encoded 3D media coded units and defined faces and perspectives according to an embodiment of the disclosure.

FIG. 11 illustrates association between encoded 3D media coding units (as in case of using MPEG V-PCC as a point cloud codec, represented here as 2D coded video data), perspectives, and faces defined for perspective-based random access according to an embodiment of the disclosure.

Referring to FIG. 11, a coded data unit association can be declared directly on the geometry faces, or can be declared only at perspectives and can then be further associated with geometry faces (with a two-operation chain association and declaration).

Figure 12:
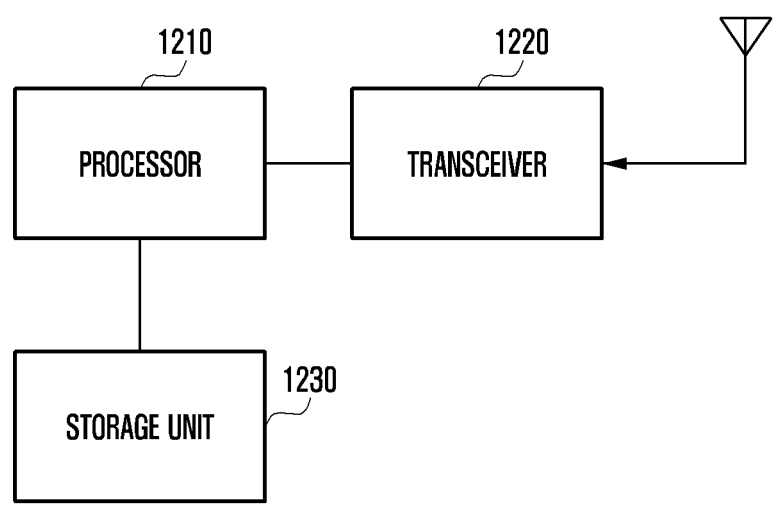
FIG. 12 is a block diagram illustrating a content provider apparatus according to an embodiment of the disclosure.

FIG. 12 is a block diagram illustrating an apparatus of a content provider according to an embodiment of the disclosure.

Referring to FIG. 12, a content provider apparatus may include a transceiver 1220, at least one processor 1210, and a storage unit 1230.

The transceiver 1220 may transmit/receive signals under the control of the at least one processor 1210.

The at least one processor 1210 may control the operation of the content provider according to various embodiments of the disclosure, as described with reference to FIGS. 3A and 3B.

According to an embodiment of the disclosure, the at least one processor 1210 may generate metadata for media content. The metadata includes first information (e.g., a perspective_id) on the perspective and second information (e.g., a face_id) on at least one face onto which a 3D object is projected, and the at least one face is associated with the perspective (perspective_faces).

The at least one processor 1210 may transmit the media content and metadata to the user's apparatus.

The metadata may further include at least one piece of information about the number of perspectives rand_perspectives and/or 3D orientation of the perspectives perspective_orientation, and/or the number of faces associated with each perspective for perspective-based random access perspective_faces, information about a geometric shape including faces, default_shape, and/or shape rotation, and other parameters described in Tables 1 and 2.

The storage unit 1230 may store at least one of instructions used by an operating system of the apparatus and the at least one processor 1210.

Figure 13:
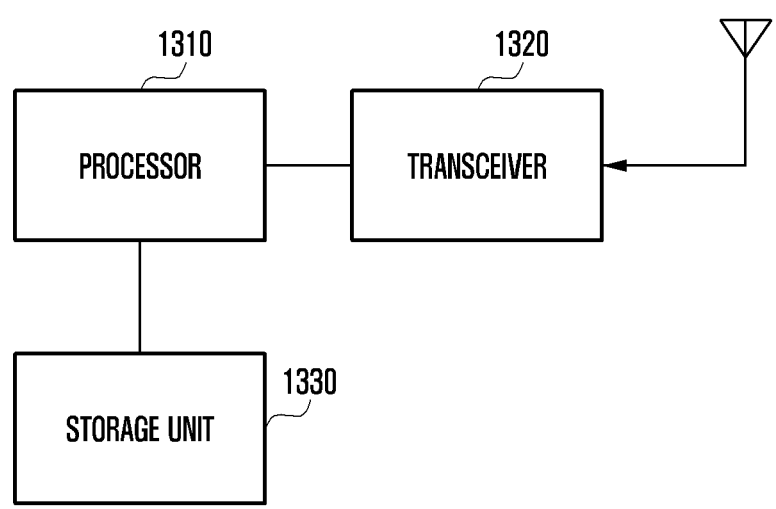
FIG. 13 is a block diagram illustrating a user apparatus according to an embodiment of the disclosure.

FIG. 13 is a block diagram illustrating a user apparatus according to an embodiment of the disclosure.

Referring to FIG. 13, the apparatus of a user (a player or client) may include a transceiver 1320, at least one processor 1310, and a storage unit 1330.

The transceiver 1320 may transmit and receive signals under the control of the at least one processor 1310.

The at least one processor 1310 may control the operation of the user according to various embodiments as described in FIGS. 8 and 9.

According to an embodiment of the disclosure, the at least one processor 1310 may receive media content and metadata. The metadata includes first information (e.g., a perspective_id) on the perspective and second information (e.g., a face_id) on at least one face onto which a 3D object is projected, and the at least one face is associated with the perspective (perspective_faces).

The at least one processor 1310 is configured to perform perspective-based random access for media content based on metadata.

The metadata may further include at least one piece of information about the number of perspectives rand_perspectives and/or 3D orientation of the perspectives perspective_orientation, and/or the number of faces associated with each perspective for perspective-based random access perspective_faces, information about a geometric shape including faces, default_shape, and/or shape_rotation, and other parameters described in Tables 1 and 2.

The metadata may be included in media data or transmitted as a separate data structure. For example, the media data may be stored and transmitted in the form of a file including a bit stream corresponding to the output of the encoder and metadata for processing the bit stream. In this case, the data may be included in the bitstream in the form of a message, transmitted as a part of file metadata, or transmitted while being included in both the bitstream and file metadata. In addition, the data may be transmitted as metadata of a service level including one or more of the files, and the specific transmission method may vary depending on the implementation of the AR service.

The storage unit 1330 may store at least one of instructions used by an operating system of the apparatus and the at least one processor 1310.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing media content including a three-dimensional (3D) object for perspective-based random access by an apparatus of a content provider, the method comprising:
   determining perspectives for the 3D object
   selecting a geometry to surround the 3D object from a geometry list based on the determined perspectives;
   assigning at least one face of the selected geometry to each perspective;
   generating metadata for the media content, wherein the metadata includes first information on the perspectives and second information on at least one face onto which the 3D object is projected; and
   transmitting the media content and the metadata,
   wherein points of the 3D object are assigned to the at least one face.

2. The method of claim 1, further comprising:
   identifying whether an orientation of the selected geometry is allowed for the 3D object; and
   rotating the selected geometry, in case that the orientation of the selected geometry is not allowed,
   wherein the metadata further includes third information on a number of perspectives for the perspective-based random access, fourth information on a shape of the selected geometry, and fifth information on a rotated orientation of the selected geometry.

3. The method of claim 1, further comprising:
   encoding the media content into a coding unit, the coding unit being based on association between each perspective and the at least one face,
   wherein the encoded media content is transmitted with the metadata.

4. The method of claim 1,
   wherein each point is assigned to a face of the at least one face where a point-to-face distance is minimized.

5. A method for accessing media content including a three-dimensional (3D) object based on a perspective-based random access by an apparatus of a user, the method comprising:
   receiving the media content and metadata, wherein the metadata includes first information on perspectives for the 3D object and second information on at least one face onto which the 3D object is projected, and wherein the at least one face is associated with each perspective;
   identifying the perspectives for the 3D object and a geometry to surround the 3D object based on the first information and the second information; and
   performing decoding and rendering for the media content based on the identified perspectives and the geometry,
   wherein the geometry is selected from a geometry list based on the perspectives, and
   wherein points of the 3D object are assigned to the at least one face.

6. The method of claim 5, wherein the metadata further includes third information on a number of perspectives for the perspective-based random access, fourth information on a shape of the selected geometry, and fifth information on a rotated orientation of the selected geometry.

7. The method of claim 6, wherein the performing of the decoding and rendering for the media content further comprises:

fetching a coding unit of the media content, the coding unit being based on association between each perspective and the at least one face.

8. An apparatus of a content provider for providing media content including a three-dimensional (3D) object for perspective-based random access, the apparatus comprising:
a transceiver; and
at least one processor configured to:
determine perspectives for the 3D object,
select a geometry to surround the 3D object from a geometry list based on the determined perspectives,
assign at least one face of the selected geometry to each perspective,
generate metadata for the media content, wherein the metadata includes first information on the perspectives and second information on at least one face onto which the 3D object is projected, and
control the transceiver to transmit the media content and the metadata, wherein points of the 3D object are assigned to the at least one face.

9. The apparatus of claim 8,
wherein the controller is further configured to identify whether an orientation of the selected geometry is allowed for the 3D object, and rotate the selected geometry, in case that the orientation of the selected geometry is not allowed, and
wherein the metadata further includes third information on a number of perspectives for the perspective-based random access, fourth information on a shape of the selected geometry, and fifth information on a rotated orientation of the selected geometry.

10. The apparatus of claim 8, wherein the at least one processor is further configured to:
encode the media content into a coding unit, the coding unit being based on association between each perspective and the at least one face; and
control the transceiver to transmit the encoded media content with the metadata.

11. The apparatus of claim 10,
wherein each point is assigned to a face of the at least one face where a point-to-face distance is minimized.

12. An apparatus of a user for accessing media content including a three-dimensional (3D) object based on perspective-based random access, the apparatus comprising:
a transceiver; and
at least one processor configured to:
control the transceiver to receive the media content and metadata, wherein the metadata includes first information on perspectives for the 3D object and second information on at least one face onto which the 3D object is projected, and wherein the at least one face is associated with each perspective,
identify the perspectives for the 3D object and a geometry to surround the 3D object based on the first information and the second information, and
perform decoding and rendering for the media content based on the identified perspectives and the geometry,
wherein the geometry is selected from a geometry list based on the perspectives, and
wherein points of the 3D object are assigned to the at least one face.

13. The apparatus of claim 12, wherein the metadata further includes third information on a number of perspectives for the perspective-based random access, fourth information on a shape of the selected geometry, and fifth information on a rotated orientation of the selected geometry.

14. The apparatus of claim 12, wherein the at least one processor is further configured to fetch a coding unit of the media content, the coding unit being based on association between each perspective and the at least one face.

15. The apparatus of claim 14,
wherein points of the media content are assigned to the at least one face, and
wherein each point is assigned to a face where a point-to-face distance is minimized.

16. The apparatus of claim 15, wherein the second information on at least one face includes a face identification (ID).

* * * * *